United States Patent

[11] 3,556,405

[72] Inventors Harold Jay Harris
  Seminole;
  James B. Johnson, Jr., Lubbock, Tex.
[21] Appl. No. 868,181
[22] Filed Oct. 21, 1969
  A continuation-in-part of Ser. No. 868,182, Oct. 21, 1969, which is a continuation-in-part of Ser. No. 787,311, Jan. 3, 1969
[45] Patented Jan. 19, 1971
[73] Assignee Gifford-Hill-Western, a division of Gifford-Hill & Co., Inc.
  Dallas, Tex.
  a corporation of Delaware

[54] SPRINKLING APPARATUS CONTROL
  8 Claims, 16 Drawing Figs.
[52] U.S. Cl. ....................................... 239/177, 239/212
[51] Int. Cl. ....................................... B05b 3/00
[50] Field of Search ............................ 239/177, 212, 213

[56] References Cited
UNITED STATES PATENTS

| | | | |
|---|---|---|---|
| 1,068,797 | 7/1913 | Mathews | 239/177 |
| 1,419,925 | 6/1922 | Heine | 239/177 |
| 2,604,359 | 7/1952 | Zybach | 239/177 |
| 2,893,643 | 7/1959 | Gordon | 239/177 |
| 2,941,727 | 6/1960 | Zybach | 239/177 |
| 3,001,721 | 9/1961 | Zybach | 239/177 |
| 3,353,750 | 11/1967 | Dowd | 239/177 |
| 3,353,751 | 11/1967 | Dowd | 239/177 |
| 3,394,729 | 7/1968 | Bower et al. | 239/212 |

Primary Examiner—Lloyd L. King
Attorney—Arnold, White & Durkee

ABSTRACT: In a combination of irrigation sprinkler supporting trussed pipe sections and movable pipe supporting towers rigidly united with motors on each tower station, each section of pipe is beyond the trussed portion thereof pivotally connected to the next section and the motor control of each tower is connected to the section of pipe outboard thereof to be responsive to the uphill and downhill as well as retarded and advanced position of that tower, the units of movable towers and the pipe therebetween powered to move continuously and evenly in a preset formation in a circular pattern and thereby distribute irrigation water in an even and predictable manner over undulating as well as flat ground.

INVENTORS
HAROLD J. HARRIS AND
JAMES B. JOHNSON JR.
BY
Ely Silverman
ATTORNEY

HAROLD J. HARRIS AND
JAMES B JOHNSON JR.
INVENTORS

BY

Ely Silverman
ATTORNEY

INVENTORS
HAROLD J. HARRIS AND
JAMES B. JOHNSON JR.
BY
*Ely Silverman*
ATTORNEY

SPRINKLING APPARATUS CONTROL

CROSS-REFERENCE TO RELATED APPLICATIONS

This is a continuation-in-part of U.S. Pat. application Ser. No. 868,182 of Harold Jay Harris, filed Oct. 21, 1969, executed concurrently and to be filed concurrently, entitled "Improved Sprinkling Process and Apparatus Therefor" which is, in turn, a continuation-in-part of U.S. Pat. 3,484,046 maturing from application Ser. No. 787,311 filed Jan. 3, 1969 by Harold Jay Harris, entitled Sprinkling Process and Apparatus Therefor.

This patent application is related to U.S. Pat. application Ser. No. 868,183 executed concurrently and to be filed concurrently by James Burl Johnson, Jr., entitled "Mobile Sprinkler Control Apparatuses" which application is a continuation-in-part of this patent application.

The above-mentioned three applications are assigned to the assignee of this patent application.

BACKGROUND OF THE INVENTION

1. The Field of the Invention is that of a process of fluid spraying and sprinkling utilizing an apparatus comprising a series of joined lengths of fluid conduits having appropriate spray outlet means and vehicular support means secured thereto, the whole being such to conform to the contour of the terrain while in spraying position.

2. Description of the Prior Art

Prior moving sprinkler apparatuses applied equal power for varied lengths of interrupted periods of time to effect control of motion of each of several pipe supporting stations at the limit of substantial allowed variation of relative back and forth position of those stations and provide no effective compensation for the varied power required to move a pipe supporting station supporting a long length of water filled pipe uphill and downhill while discharging a substantial volume of water upwardly from such pipe at substantial pressures. Sprinkling apparatus which depends upon movement of movable wheeled pipe supports controlled by substantial bending or springing of the pipe located between the support towers or stations require the development of substantial lags between pairs of such pipe supporting towers or stations prior to actuation of the lagging station and prior to stopping of the station in an advanced position. Also, failure to compensate for the uphill motion as well as lagging position thereof develops further lags in the uphill moving pipe supporting stations relative to like pipe supporting stations moving over level ground and results in a nonuniform distribution of water.

SUMMARY OF THE INVENTION

Mechanical amplification of the function of apparatus of copending application of Harold Jay Harris is provided so that a one degree twist of portion of pipe string between one station and its neighbor produces readily a motion in excess of one-fourth of an inch to the control mechanism to the motor and a different motor control means and motor is used.

In a combination of distributing pipe, movable pipe supporting towers, and a drive system for the towers, a motor control unit permits application of differing amounts of power to each of several wheeled pipe supporting tower vehicles traversing concentric circular paths and providing that the uphill and downhill motion of that tower as well as its lead or lag relative to its neighboring towers controls its speed; the pipe between towers is guyed to concentrate any bending and twisting of, as well as any bending or twisting of the pipe between the stations to a small portion of the pipe; an improved combination of means for sensing such bending and/or twisting and motor control means located on such portion, which portion is spaced away from neighboring towers; the sensing means are responsive to change in bend or rotative position of the pipe and serve to control the motion of neighboring central stations; the system is thereby very responsive to the uphill or downhill direction of travel of that central station as well as to relative lag or lead in position of the pipe and station at that point; and very quickly corrects for conditions that might lead to undesired position of the towers as well as correcting for undesired position of the towers by applying to the towers desired different power and speeds as as needed. This structure provides that there is a summation of the effects of retard and going uphill and the reverse.

BRIEF DESCRIPTION OF THE DRAWINGS

Section 24A–24A of FIG. 21 corresponds to section 24B–24B of FIG. 24. Section 25A–25A of FIG. 21 corresponds to section 25B–25B of FIG. 24.

FIGS. 24 through 33 illustrate, in exaggerated manner, the relations of elements of apparatus 211 connected to adjustment arm 300 (also shown diagrammatically) in differing positions of station 215 relative to pipe section 224. These FIGS. 24–33 are not to scale and are exaggerated to show relations discussed quantitatively in the text and not readily illustrated if drawn to scale.

Figure 22:
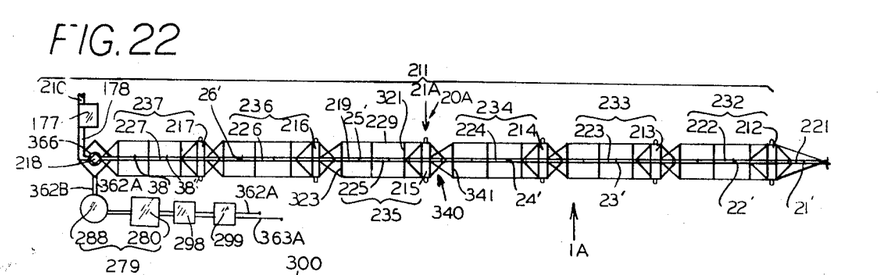
FIG. 22 is a top plan view of apparatus 211 portions.
Figure 23:
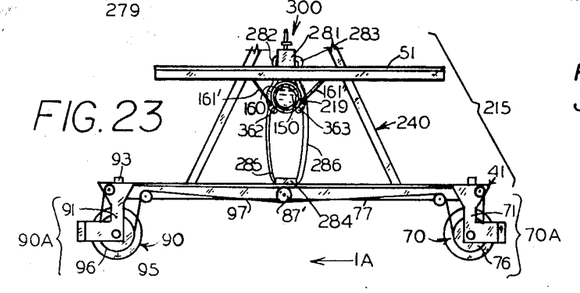
FIG. 23 is a side view of a portion of the station 215 of apparatus 211 as seen along the direction of arrow 23A of FIG. 21.

The term "radial" as used herein refers to the rightward direction along pipe series 219 in FIG. 22 away from the fixed central station 218; and the term "central" refers to the leftward direction along pipe series 219 in FIG. 22, towards the fixed central station 218. The term "forward" refers to the direction of motion of apparatus 211 counterclockwise as seen from above and as shown in FIG. 22 and is direction of arrow 1A of FIG. 22 and "rearward" is the opposite direction.

DESCRIPTION OF THE PREFERRED EMBODIMENT

The apparatus 211 generally comprises a combination of an electric power source 288 and conduits, irrigation sprinkler supporting pipe and movable pipe supporting towers as 212 through 217 rigidly united with portions of the pipe and tower station motors on each station so arranged that the movable towers and the pipe therebetween move continuously and evenly and thereby distribute irrigation water in an even and predictable manner.

More particularly, the apparatus 211 comprises a series of like units of guyed pipes and vehicle tower stations as 233, 234, 235, 236 and 237, a generally like unit 232, a fixed station 218 and an electric power developing and transmission assembly 279. Apparatus 211 operates on a water supply source 210.

Each unit as 235 comprises a vehicle tower station, as 215 and a portion, as 225, of a string of pipe, 219, firmly fixed thereto and located centrally (as below described) thereof. Pipe string 219 comprises a pipe portion 221 which is located on the radial side of the most radial vehicle tower station 212; a like pipe portion 222 is located on the radial side of vehicle tower station 213 between tower stations 213 and 212; a like pipe portion 223 is located radially of station 214 and located between stations 213 and 214; correspondingly like portions of pipes 224, 225, 226 and 227 are located centrally of like vehicle stations 214, 215, 216 and 217 respectively and are operatively attached thereto and supported thereon as below described.

The units 233—237 are identical, however station 212 of unit 232 is rigidly attached at its radial side to a guyed portion 221 of pipe string 219, which portion 221 is continuous with portion 222 thereof.

Irrigating nozzles as 38' and 38" are located on pipe portion 227 and like nozzles 21', 22', 23', 24', 25', and 26' are located on the like pipe portions 221 through 226 respectively to effect distribution to all portions of the field 28 of water passed into the central portion of the pipe 219 via a central vertical pipe 220 at station 218 and operatively attached to water source 210. Portions 220—227 are continuous. Each of such nozzles or sprinkling heads as 38' is located at suitably spaced distances along each of the pipe portions as 221—227, and is provided with a shutoff valve. The sprinkling heads may be of any suitable type, such as provided with a nozzle for discharging a jet of water against a flat blade which spreads the stream and causes a greater area behind the pipe to be watered by each head. The sprinkling heads are preferably spaced apart in accordance with the width of the stream of water discharged from each head, with a slight overlap for complete field coverage, the nozzles preferably varying the amount of water discharged proportional to the distance from the center. That is, nozzles farther from the center discharge a greater amount of water, or be spaced closer together because of the greater territory to be covered at a longer radius. The string of pipe 219 is preferably of a sufficient diameter, such as 6 inches, to provide a reservoir of water which, therefore, may be at a low pressure, such as 25 pounds per square inch, so that the pressure at each of the heads 38 will be substantially the same. The heads 38 preferably do not discharge large volumes of water but merely enough to approximate a light to medium rainfall, so that as the pipe string 219 is rotated slowly and evenly around the field 28, the water will have an opportunity to soak into the ground without forming pools from which an undue amount of water may tend to evaporate. Thus, to adequately water the field, it may be necessary for the apparatus 211 to operate 1 to 3 days to transverse a field of one-quarter section size completely.

Various alternative means may be provided for delivering the desired liquid from pipe string 219 to the land over which it passes, including a series of perforations formed in and extending throughout the length of the pipe. Those perforations near the central end of pipe portion 227 are preferably somewhat smaller than those near the radial end portion 221 of the pipe series 219 so as to obtain an even distribution of the liquid over the field 28.

Each movable vehicle station as 215 comprises a rigid A-shaped frame assembly 240 and a wheel assembly 41.

Figure 20:
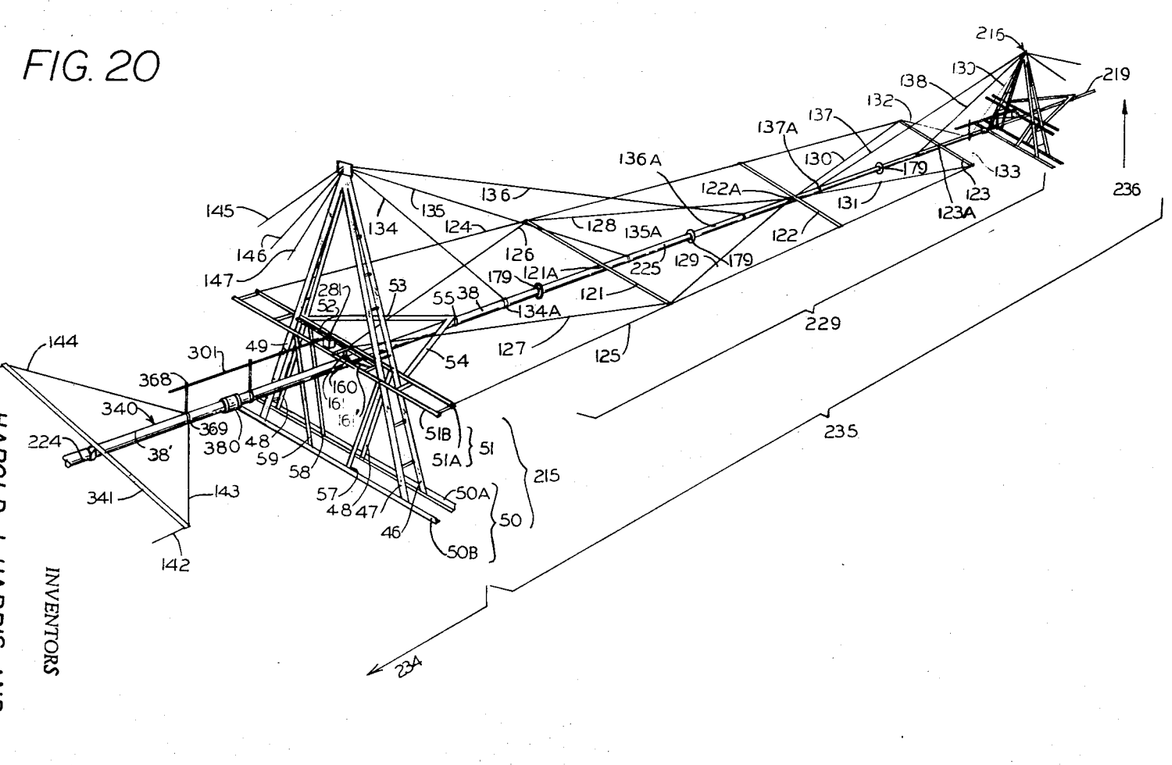
FIG. 20 is a perspective view of the arrangement of cable and other structures between and in association with two adjacent tower stations as 214 and 216 of apparatus 211 as seen from above and obliquely, in direction of arrow 20A of FIG. 22.
Figure 21:
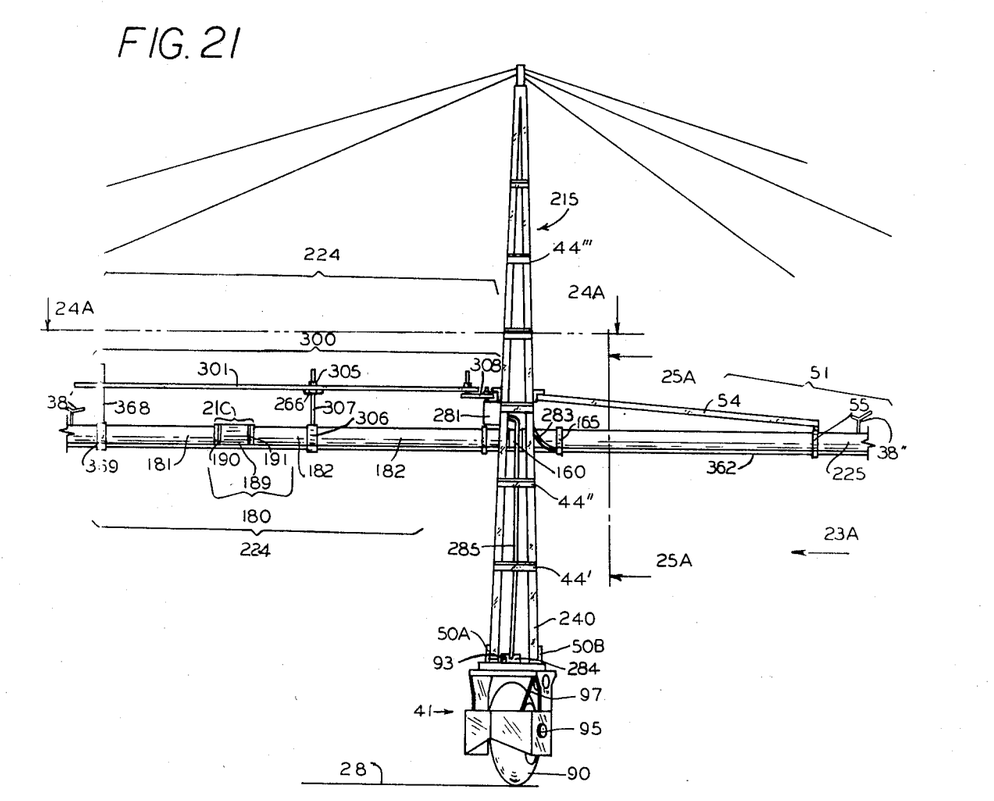
FIG. 21 is a front end view of a typical movable tower station 215 according to this invention as seen along the direction of arrow 21A of FIG. 22.

Each frame as 240 comprises a rigid central front member 46, a rigid lateral front member 47, a rigid central rear vertical member 48 and a rigid radial rear vertical member 49. Members 46 and 47 extend forwardly and downwardly; members 48 and 49 extend rearwardly and downwardly as in FIGS. 20 and 22. The members 46—49 are connected at their bottom to a rigid horizontal wheel support member 40 and at their top to cable supporting plate 45; the center portion of the members 46, 47, 48 and 49 are firmly fixed to support a rigid horizontal guide support member 51 and as shown in FIG. 21 members 46 and 47 are joined by strips as 44' and 44" and 44" as are members 48 and 49. Rigid truss elements 56, 57, 58 and 59 are attached to elements 46, 47, 48 and 49 respectively at their top and bottom and provide rigidity to each frame element 50 as shown in FIG. 20. These are all two inch steel ells in the particular embodiment 211 of the invention and provide for a rigid support to the tower structures as 214 and 215.

Frame 240, is, as shown in FIGS. 20 and 21, a double frame of rigid steel ells, with member 50 composed of two parallel like elements 50A and 50B with member 50A shown and described as joined to members 47, 49, 57 and 59 and member 50B shown joined to members 46, 48, 56 and 58 and several steel ells running between members 50A and 50B along the front to back length thereof; there is a pivot plate between the rear end of members 50A and 50B and a front pivot between the front end of members 50A and 50B with the pivot bolts passing through said plates and with bolts fixing the location of the assemblies 70A and 90A relative to the lengths of the elements 50A and 50B so that a nonskidding circular path will be traversed by the wheels.

Member 51 is also formed of two like and parallel members, 51A and 51B, with 51A shown as attachment to members 47, 49, 57 and 59 and member 51B joined to members 46, 48, 56 and 58 and several steel ells running between and attached to members 51A and 51B along the front to back length thereof. Clamp 160 is firmly supported in element 51 by such a transverse member.

A horizontal rigid member 52 is attached to the members 46—49 above member 51. Members 51A and 51B of member 51 are firmly fixed to and support the portion of pipe string 219 therebelow; rigid transverse element 51 extends from elements 56 to 58 and from 57 to 59 and element 52 supports motor control unit 281 of the tower above element 51.

A rigid rear pipe support truss element 53 extends centrally and forwardly from the frame 240 as shown in FIG. 20 a corresponding front element 54 is attached to the element 51 and 46 and extends centrally and rearwardly. The elements 53 and 54 are joined at their central edge and they are there firmly joined to a band 55; the band 55 firmly holds the adjacent portion of pipe string 219, 225 in FIGS. 20 and 21; a clamp 160 is firmly located on the portion of pipe string 219 between elements 46—49 and below guide support 51. A hanger 161 extends across and is firmly attached to element 51 and clamp 160.

The wheel assembly 41 comprises a rear wheel assembly 70A and a front wheel assembly 90A. Assembly 70A is pivotally attached to the rear end of member 50 and assembly 90A is pivotally attached to the front end of member 50 on plates affixed thereto.

The rear wheel assembly 70A comprises a rear wheel 70, a rear wheel fork 71, a rear wheel fork base, a rear wheel fork base bolt, a rear wheel shield, a rear wheel axle, a rear wheel sprocket and a rear wheel sprocket chain. The wheel is located on an axle which in turn is rotatably located at bottom of fork 71. The top of the fork 71 has a base which is rotatably located on a plate member by vertical rear wheel bolt fixed to the base. A rear wheel shield is firmly located on the fork 71 and serves to part the crops through which the movable tower station (as 215) moves. A rear wheel sprocket 76 is coaxially located on the axle 75 with the wheel 70 and is firmly fixed to the wheel 70. A rear wheel sprocket chain joins the rear wheel sprocket 76 to drive it.

The front wheel assembly 90A comprises a front wheel 90, a front wheel fork 91, a front wheel fork base, a front wheel fork base bolt, a front wheel shield, a front wheel axle, a front wheel sprocket and a front wheel sprocket chain. The front wheel 90 is located on an axle which in turn is rotatably located at bottom of fork 91. The top of the fork 91 has a base which is rotatably located on a plate member by a vertical wheel bolt fixed to a base. A front wheel shield is firmly located on the fork and serves to part the crops through which the movable tower station moves. A front wheel sprocket is coaxially located on the axle 95 with the wheel 90 and is firmly fixed to the wheel 90. A front wheel sprocket chain 97 joins the front wheel sprocket 96 to drive it.

The motor 84 drives a double sprocket wheel 87. One set of teeth on the double sprocket wheel 87 is operatively connected to the front wheel chain 97 and another to the rear wheel chain 77 for movement thereof as determined by the position of the parts in motor control 281.

The above description of the vehicle tower station 215 is applicable to all of the intermediate vehicular tower stations as 213—217 of apparatus 211 as they all (as shown for 215) have the same structure in general and in particular, except for the station next to the end i.e. station 212, are all identical in structure. Station 212 does not have elements such as 300 as are shown and provided on station 215.

The assembly 279 comprises a prime mover internal combustion engine motor 280, generator 288, a main electric input line 362 and main return line 363, and, on each station electric control switch as 281 and station electric vehicle station motors as 284, and a station control assembly 242 all operatively connected.

The generator 288 is directly connected to main electric input line 363A which is firmly mechanically attached to line 219 as by clamps, as 164 and 165; line 362A extends from outlet of generator 288 to a rotatable distributor 366 on station 218 to line 362.

An insulated electric conductor conduit or line 362 extends from distributor 366 to the most radial station in the series (as 212 in FIG. 22). Another main insulated electric conductor conduit return line 363 is connected to the branch line 283 of each station and extends along the string of pipe 219 from the most radial station of the system 211 (as 212 in FIG. 22) to a rotatable distributor 367 on station 218; line 363A extends therefrom to generator 288. Clamps as 165 on pipe portions as 221—227 hold lines 363 and 362 to pipe string 219. Motor 280 is controlled by throttle 298 which throttle is controlled by voltage regulator 299 connected to line 362A to keep a predetermined voltage in line 362A and 362B.

The control assembly for each intermediate tower station (between the end stations 212 and central pivot station 218) as 213—217, and referring to station 215 as exemplary, comprises, on the movable tower station as 215, a control box 281 with an electric motor 284 and lines 282, 283, 285 and 286 and, outboard of each such station as 215, a displacement sensing unit 300 comprising tongue 368, joint 180, pivot support rod 307 and a control beam 301.

A branch input line 282 is operatively connected to one terminal of control box 281 and provides for transmission there into of electric power from line 362 and branch line 283 is connected to another terminal of box 281 and connects to main return conduit 363 from the control box 281. The motor 284 is operatively connected by an insulated electric conduit or line 285 to one output terminal of box 281 and a second insulated electric conduit or line 286 connects from the motor to another terminal of box 281.

The motor 284 drives a double sprocket wheel as 87'. One set of teeth on the double sprocket wheel 87' is operatively connected to the front wheel chain as 97 and another to the rear wheel chain as 77 for movement thereof as determined by the position of the parts in control box 281.

Figure 24:
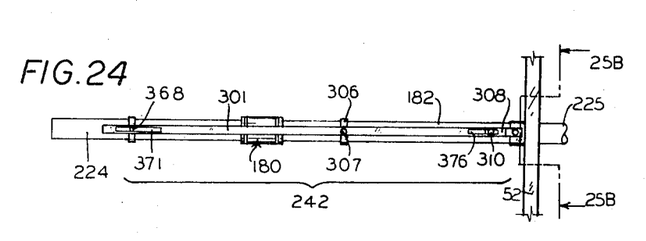
FIGS. 24, 26, 28, 30 and 32 are diagrammatic top views along section 24A–24A of FIG. 21 and section 24B–24B of FIG. 25.

The central end of pipe portion 224 is shown in FIGS. 24--34 as 182. This portion of the pipe 224 is firmly connected to and is a radial continuation pipe string portion 225 and is located outboard of station 215. The radially adjacent portion of the pipe 224 is indicated as 181. Portions 181 and 182 are joined by a pliant coupling 180 in a fluidtight, as well as mechanically reliable manner. Each portion of the pipe string as 225 at a station as 215 is firmly held to the frame of that station, 240, by clamps as 160 and 55. Thereby the portion of the pipe string as 225 at each station as 215 is firmly fixed thereto.

The pipe string 219 comprises a series of lengths of pipe joined together at flanges as 179 to form a rigid conduit unit; these conduit units extend for a distance that is the same as the distance between towers and are operatively connected to each other by a pliant joint or coupling as 180. The clamps as 160 and 55 of each station as 215 firmly grasp a rigid portion of the conduit unit. The pliant joint portion is located outboard of each station as 215 so that the portion of the arm 301 actuated by the arm 368 and actuating the unit 281 will have, at pin 310 a sufficiently long travel to provide an effective displacement thereof that arm 308 and control 281.

The pliant joint or coupling 180 comprises a rigid hook as 183 that is firmly attached to and supported by a rigid neck 184 that is firmly attached to a shoulder 185 which is firmly attached to the portion 181 of the pipe string 219. A rigid pin 186 that extends horizontally and transversely to the length of string 219 is firmly attached to and supported on a shoulder 188 of the pipe portion 182. The hook 183 is rotatably supported on the pin 186 but the grip thereon is loose enough to allow free movement about a transverse axis and a vertical axis passing through pin 186 and, also, that hook 183 rotate about the longitudinal axis of string 219 freely at least to a limited degree, i.e. at least 10 degrees; such a structure is generally shown in U.S. Pat. No. 1,528,070.

A sleeve 189 which is flexible and watertight is firmly attached to the outer surface of outer end of pipe 182 and the outer surface of inner end of pipe portion 181 and is held in position by clamp 190 on portion 181 and by clamp 191 on portion 182.

The pliant rotatable and twistable joint or coupling as 180 is thus located outboard of the central station 215 between each of the two serially and operatively connected portions as 181 and 182 of the pipe string 219 between each of the stations as 214 and 215.

Substantially all the rotation about the longitudinal axis of the pipe string 219 between each of the stations in the apparatus 211 as stations 214 and 215 up to about 10 degrees, i.e. all the effective twist of the pipe string 219 between the stations such as 214 and 215 occurs across such coupling as 180 at portions as 181 and 182.

The motor adjustment assembly 242 of embodiment 211 comprises the adjustment or control arm unit 300 and the motor control unit 281. The adjustment or arm control unit 300 comprises, as seen from above and shown in FIG. 21 a horizontally elongated rigid beam 301, pivot support rod 307, joint 180 and adjustment control arm 308.

A clamp 369 firmly grips the outside of pipe portion 181, the clamp 306 firmly grips the pipe portion 182. Control tongue 368 is a vertical stiff rod which is firmly fixed to the top of clamp 369. The rigid vertical control rod arm or tongue 368 is attached to clamp 369 and thereby the pipe portion 181. Clamp 369 is firmly located on each pipe portion as 224 halfway between the vehicle station as 215 of the near central unit as 235 and the most radial brace as 341 of the unit 234. The rigid control tongue 368 is firmly fixed to the top of that clamp 369 and extends upward through and past a slot 371 in the radial end of arm 301 of assembly 300 and forms a smooth sliding fit therewith. The tongue 368 is located at one-half of the distance between the centrally adjacent tower 215 and the brace 341 of the adjacent, radially located guying assembly for the portion as 224 of the pipe string 219. A clamp 306 is firmly attached to pipe portion 182. Adjustment arm pivot support rod 307 is a rigid vertical cylindrical rod firmly fixed the top of clamp 306; pivot support rod 307, thus firmly attached by clamp 306 to the pipe portion 182, supports and locates a bearing plate 266 (and beam 301 on top of that plate 266) at a distance twice the diameter of pipe portion 182 above the top of pipe portion 182.

A rigid horizontally elongated straight metal beam 301 is supported at its center on bearing plate 266; a sleeve 305 in beam 301 at the center of beam 301 forms a smooth rotatable fit with and receives top of rod 307; beam 301 rests rotatably on bearing plate 266. The radial end of beam 101 has a lengthwise vertical slot 371 extending therealong; the other, central, end of beam 101 has a longitudinally extending slot 376 and a vertical pin 310 at peripheral end of arm 308 smoothly and slidably fits therein.

In embodiment 211 of this invention there are some import and dimensional relations in regard to control 281 relative to the control arm unit 300.

The control box 281 comprises a vertical guide bar 202, a switch plate 204, a switch-starter unit 203, control arm 308 and box 205. The bar 202 is a rigid vertical steel bar that is rotatably supported in the box 205. Box 205 is a rigid watertight box supported on member 51. The upper portion of the bar 202 extends upward through a watertight seal 206; the guide bar 202 at its upper end is firmly fixed to the center end of a rigid horizontally extending control arm 308. Plate 204 is a rigid electrically insulating horizontal plate firmly fixed to bar 202 within the box 205. Fixedly located movable points 207 and 207' are located on plate 204 and effectively contact adjustably fixed points 208 and 208' supported on the box 205 to activate a starter 209 and on a predetermined location of the arm 308 and to disconnect the motor 284 in a different location of the arm 308. Points 308 and 208' actuate a starter 209 for the motor 284 when arm 308 and plate 204 are rotated to one position as diagrammatically shown in FIGS. 24, 26 and 28, and to deactivate it when in a different position as in FIGS. 30 and 32. The size and position of arm 308 and unit 203 are chosen to deactivate the motor 284 on a counterclockwise rotation of arm 308 of 4 degrees, which, in the apparatus provided corresponds to a twist of station 214 and 215 of 2 degrees or an advance of one station (215) before the other (214) of about 4 inches for the 90 to 120 feet spacing between stations as 214 and 215. FIG. 21 is drawn to scale to show size of unit 300 components.

The control assembly for each intermediate tower station (between the end stations 212 and central pivot station 218) of embodiment 211, and referring to station 215 as exemplary, comprises, on the movable tower station as 215 a control box 281 with an electric motor as 284 and lines as 282, 283, 285 and 286, and, outboard of each such station as 215, the motor adjustment displacement assembly 242.

A branch input line as 282 and 283 are each operatively connected to one terminal of control box 281 and provides for transmission thereinto of electric power from line as 362 and 363. The motor as 284 is operatively connected by an insulated electric conduits or lines as 285 and 286.

Spring loaded snap switches of conventional construction can be used in lieu of points 208 and 208' and 207 and 207'. Those snap switches are mechanically actuated by points as 207 and 207' when the arm 308 moves past a predetermined position to actuate the motor 284 while such snap switches are moved to their disconnected or open circuit position when the points as 207 and 207' move in the opposite direction past those snap switches with a DC motor.

The points 208 and 208' may each comprise a plurality of insulated contact points, each separated from the other electrically and connected in series to each other through a separate resistor and the points 207 and 207' would be electrically contacting brushes whereby the speed of such a variable speed motor may be varied as the plate 204, actuated by the arm 308 is moved to varied positions relative to the points 208 and 208'.

An adjustable end is threaded on to the threaded peripheral end of arm 308 and firmly supports a vertical cylindrical pin 310; pin 310 has a smooth slidable fit in a longitudinally extending straight slot 376 located at the central end of beam 301. The construction of apparatus 211 provides that there is no bending of string of pipe 219 from the attachment thereof at clamp 160 of station 215 and brace 321; similarly there is no bending of pipe string 219 between clamp 160 of station 215 and the most distant transverse brace attached thereto by wires, as 123. Such bending of pipe string 219 as is permitted in a unit as 234 is that which occurs between one clamp as 160 on one station as 215 and the adjacent transverse brace as 341, such bending is measured at a point (clamp 369) spatially removed from the stations 215 and 214 frames. This arrangement permits continued unequal movement of one peripheral or radial station, as 214, relative to another, more centrally located station, as 215 (radial and central as shown in FIGS. 20 and 22), station 215 moving linearly three times as far per hour of operation as does station 217 while keeping the longitudinal axis of the pipe string 219 substantially a straight line from central pivot station 218 to outermost station as 212 of the apparatus 211.

The structure 229 and firm clamp of portion of pipe 219 by clamps 55 and 160 on each tower station as 215 provides that there is no bending of the pipe at the attachment of each station to the portion of pipe string 219 and such bending as occurs is at the zone of pipe portion as 340 between the wheels of one central station as 215 and most central of the guide braces (as 341) rigidly connected to the tower station (as 214) radial to that first station (215) as shown in FIG. 20; hence the corrective action of the beam 301 shown in FIGS. 24—33 occurs rapidly before any permanent distortion of the pipe portion in zone 340 occurs.

A feature of embodiment 211 is that there is no bending of the pipe string 219 at each support as 214 and 215. By this apparatus arrangement there is no bending of the pipe at any intermediate support, all the bending is at a point between supports, and unit 300 for each vehicle motor station is the slave to only one master, the unit that is radial thereof, and is substantially insensitive to any bending that might occur at a unit, as 236, central thereof.

For this purpose the cables 342 and 343 are loose relative to the other cables of assembly 29; also, according to this invention, cables 342 and 343 may be omitted; also according to this invention cables 342 and 343 may terminate at their central end at clamp 369 rather than at the station 215.

This particular guying assembly 229 provided no resistance to rotation of the portion of pipe as 224 between the stations, as 214 and 215 between stations as 215 and 216, etc., about the longitudinal axis of the pipe string 219 and accordingly does not interfere with the sensitivity of the motor control as valve 281 of each of the pair of neighboring stations as 214 and 215 to the relative angular position of one, central station, 215 to the position of the other adjacent radially located station as 214 about the longitudinal axis of the pipe string 219.

Figure 25:
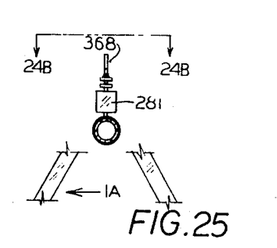
FIGS. 25, 27, 29, 31 and 33 are diagrammatic vertical sectional view along section 25A–25A of FIG. 21 and along section 25B–25B of FIG. 24.

During travel of the apparatus 211 over a flat horizontal field perpendicular to the length of the pipe string 219 in its forward motion (shown in as direction 1A in FIG. 22) the plane the movement of the longitudinal axis of the pipe string 219 is parallel to the plane of movement of the bottom of wheels of each of its stations, as 212 through 217. Each portion, as 224 of the string 219 is firmly attached to the frame of a station as 215 at clamps corresponding to clamps 160 and 55 at station 215. FIGS. 24 and 25 diagrammatically represent the position of beam 301, pipe string portions 224 and 225, tongue 368 and pivot pin rod 307 and arm 308 when the longitudinal axes of adjacent pipe portions as 224 and 225 of string 219, each which portions is firmly attached to each of a pair of one radial and one central station, as 214 and 215 respectively, lie in the same flat vertical plane and the bottom of the wheels of each such station, as 214 and 215, are on the same flat horizontal plane, the plane of the field, as 28.

As shown diagrammatically in FIGS. 28 and 29, 32 and 33, the position of arm 308 is a reflection of the degree of twist of station 214 and portion 224 of string 219 relative to station 215, or, otherwise phrased, to the downward or upward direction of travel of the central station, as 215, relative to the plane of movement of the pipe string portion, as 224, radial thereto during travel of the apparatus 221 perpendicular to its length.

As shown in FIGS. 26, 27, 30 and 31 the tongue 368 and control arm 308 and action of controller 281 are also sensitive to turning of the portion 224 of the pipe string 219, which portion 224 is firmly attached to the station 214, relative to the portion 225 of string 219, which portion 225 is firmly attached to station 215.

Figure 26:
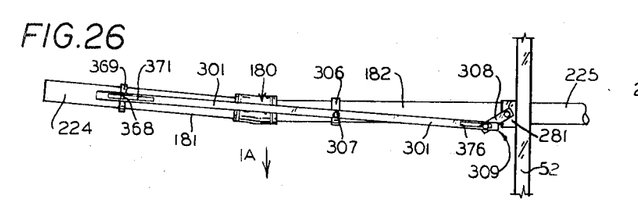
Figure 27:
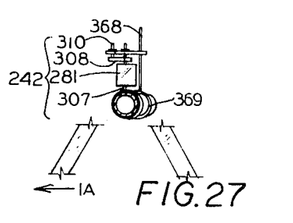
Figure 28:
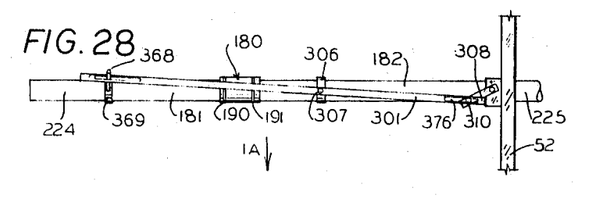
Figure 29:
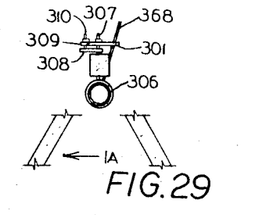

Regarding the portion of the field 28 on which the wheels of station 215 rest as level and the plane of section 24A-24A as parallel thereto, as shown in FIGS. 28 and 29, the displacement of tongue 368 on downwardly tilted forward motion of the station 214 relative to horizontally moving station 215 produces a forward displacement of the top of tongue 368 relative to the pivot support rod 307 (relative to the position thereof in a condition of apparatus 211 shown in (FIGS. 24 and 25) and causes the same effect on arm 308 as does the bend in the pipe portion 224 at zone 340 shown in FIGS. 26 and 27 when the station 214 is advanced ahead of its intended position relative to the station central thereto, as 215, and accelerates the action of the motor for that station 215, and moves station 215 forwardly more rapidly until the forward displacement of tongue 368 is removed. Regarding plane of section 24A–24A as parallel to the portion of the field 28 on which the wheels of the station 215 rest and that portion as tilted and the portion of the field 28 on which the wheels of the station 214 rest as horizontal, as shown in FIGS. 28 and 29 displacement of tongue 368 on upwardly tilted forward motion of the station 215, i.e. relative to horizontally moving station 214, produces a forward displacement of top of tongue 368 relative to the pivot support rod 307 (relative to the position thereof in a condition of apparatus 211 as shown in (FIGS. 24 and 25) and causes the same effect on arm 308 as does the bend in the pipe portion 224 at zone 340 shown in FIGS. 26 and 27 when the station 214 is advanced ahead of its intended position relative to the station central thereto, as 215, and accelerates the action of the motor for that station 215.

Figure 30:
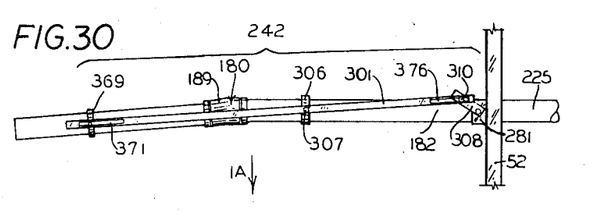
Figure 31:
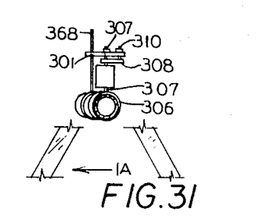
Figure 32:
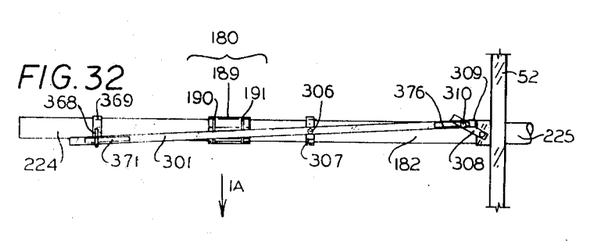
Figure 33:
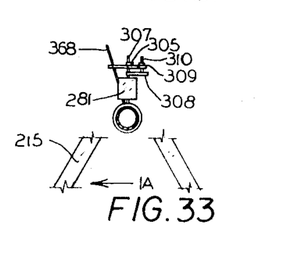
Figure 34:
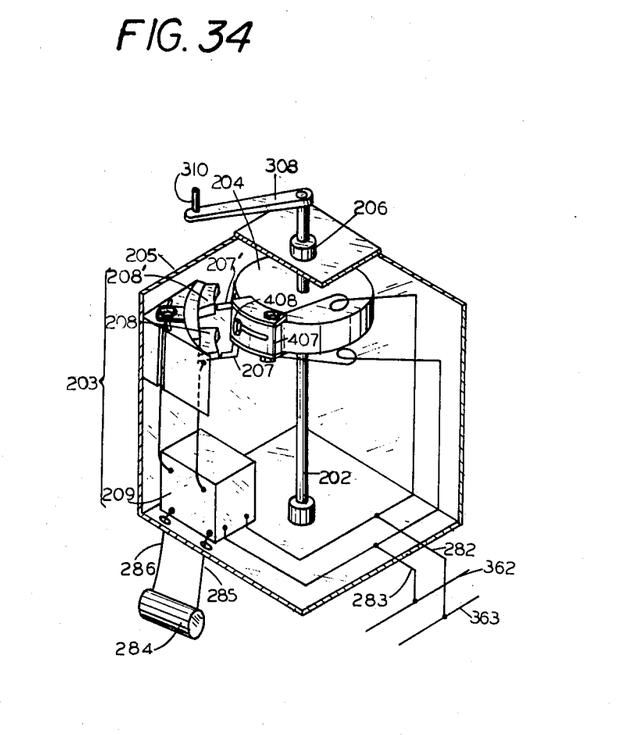
FIG. 34 is a perspective diagrammatic broken away view of control box 281 shown enlarged over its showing in FIGS. 21–33.
Figure 35:
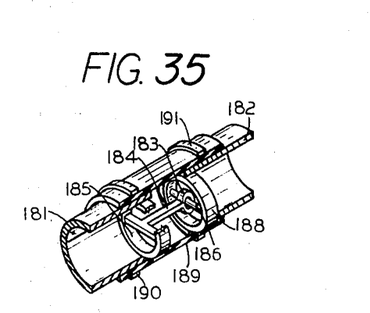
FIG. 35 is an enlarged broken away oblique diagrammatic view of zone 21C of FIG. 21.

Regarding the portion of the field 28 on which the wheels of station 215 rest as level and the plane of section 24A–24A as parallel thereto, as shown in FIGS. 32 and 33 the displacement of tongue 368 on upwardly tilted forward motion of the station 214 relative to a horizontally travelling station 215 produces a backward displacement of the top of tongue 368 relative to the pivot support rod 307 (relative to the position thereof in a condition of apparatus 211 shown in FIGS. 24 and 25) and causes the same effect on arm 308 as does the bend in the pipe portion 224 at zone 340 shown in FIGS. 30 and 31 when the station 214 is lagging behind its intended position relative to the station central thereto, as 215, and slows the action of the motor for that station, 215, and slows the the forward speed of station 215 until the backward displacement of tongue 368 is removed. Regarding plane of section 24A–24A as parallel to the portion of the field 28 on which the wheels of the station 215 rest and that portion of the field being regarded as tilted and the portion of the field 28 on which the wheels of the station 214 rest as horizontal, as shown in FIGS. 32 and 33, the displacement of tongue 368 on downwardly tilted forward motion of the station 215 relative to a horizontally travelling station 214 produces a backward displacement of the top of tongue 368 relative to the pivot support rod 307 (relative to the position thereof in a condition of apparatus 211 shown in FIGS. 24 and 25) and causes the same effect on arm 308 as does the bend in the pipe portion 224 at zone 340 (shown in FIGS. 30 and 31) when the station 214 is lagging behind its intended position relative to the station central thereto, as 215, and slows the motor for that station 215 and slows the forward speed of station 215 until the backward displacement of tongue 368 is removed.

As illustrated above in FIGS. 24 through 33, the energy transmitted to each station motor and speed of each station is responsive to the bending or twisting of the portion 224 of the pipe string radial, as at portion 340, to such station, as 215, while the location of the major portion of the pipe, as 225, central of that station and between that station (215) and the station central thereto (216) is fixed firmly to such station 215 as by clamps 55 and 160 and pipe guying assembly 229. Clamp 55 is firmly held by members 53 and 54 to the frame, as 40, of each station, as 215, in apparatus 211, and clamp 160 is firmly held in position by rigid members 161, 161′, 161″ to members as 51A and 51B of frame 240.

Rotation of one, as 214, of a pair of stations as 214 and 215 in apparatus 211 about the longitudinal axis of the pipe string 219 results in that substantially all of the twist of pipe string portion 181, which portion 181 is fixed to the radial station as 214, is reflected and measurable by and indicated by this rotative motion of the elongated tongue 368 about the longitudinal axis of the pipe string 219 as that tongue 368 is fixed to the portion 181 of string 219, and pipe string portion 182 is fixed firmly to the central station 215. The location of the bar 368 is at a sufficient distance from the vertical axis passing through the pliant coupling 180, about which the pipe string 219 portion 224 rotates when station 214 is in advance of station 215 (on in retard thereof), to provide a significant displacement of the control means 308 to effectively control the motion of station 215.

As tongue 368 is supported on its clamp 369 and clamp 369 is halfway between brace 341 and the neighboring station 215 in apparatus 211 and distance between the brace 341 and the station 215 is 22½ feet (as each of the braces are spaced at ¼, ½ and ¾ of the distance between the towers and the distance between the towers is set out at 90 feet), the distance of the tongue 368 is thus 11¼ feet from the brace 341 and from arm end 309, and the pivot support rod 307 is, as shown in FIG. 21, located by the adjustment arm support one-half the distance between the arm end 309 and the tongue 368. The pipe string 219 is 6 inches in diameter and length of arm 368 is, as shown in FIGS., from top of pipe portion 224 to the bottom of beam 307, two times the 6 inch diameter of the pipe elements forming the string 219. Accordingly, if one station as 214 is located on ground sloped at an angle of one degrees to the ground on which neighboring station 215 stands so that there is a 1.00 degree twist of the pipe string 219 between the station 214 and the neighboring station as 215, then, across the 11¼ foot distance from station 215 to tongue 368 there will be a twist, i.e. a rotation about the longitudinal axis of the cylindrical pipe string 219 of 1.0 degrees of the pipe 224 between the point of its attachment to the clamp 369 and its point of attachment to the clamp 160, (clamp 369 being attached to the tongue 368 and the clamp 160 attached to the station 215). Such twist of the pipe 224 causes, with a 6 inch pipe diameter and a 12 inch arm 368 a 0.25 inch movement of the radial end of arm 308. A 1 degree rotation of the arm 368, which is equivalent to a 1 degree twist of the neighboring stations 214 and 215 relative to each other, thus produces forward or backward change of position 0.25 inch of the arm 308, in direction as above discussed for FIGS. 24–33; this produces a significant effect on switch 281 as this 0.25 inch is, here, a sufficient displacement to provide a substantial change in speed of a station as 215. A rotation of 1.0 degree of arm 368 corresponding to 1.0 degree rotation of stations 214 relative to station 215, and providing 0.25 inch displacement of the central end of arm 301, corresponds to a 5 degree 45 minute rotation of the 2½ inch long arm 308 about bar 202. The switch unit 203 in control box 281 is sensitive to a 4 degree rotation of bar 202 to turn the motor as 284 on and off as herein described in relation to FIGS. 21–33, and 33A.

In regard to the sensitivity of units as 221–227 of apparatus 211 to turn in a horizontal plane of portions as 181 and 182 about a vertical axis passing through joint as 180, as on advance of station 214 relative to station 215, as diagrammed in FIGS. 26, 27, 30 and 31, a 4 inch forward or rearward movement of the station 214 at one end of a 90 foot portion of pipe string 219 relative to 215 will produce a 0.23 inch movement in the position of the tongue 368 located within slot 368 of arm 300, at least, and such displacement has a substantial effect, as above described, on control 281 which has, as above described, only a 2½ inch arm 308. Moving pivot support rod 307 laterally also increases turn sensitivity when arm 301 has fixed length. Joint 180 is adjacent and lateral of clamp 306 in 211.

The control structure 242 provides that there is algebraic summation of effects of retard and going uphill and of the effects of advance and going downhill as well as a summation of separate effects of retard and going uphill above described for a central station as 215 relative to a radial station as 214 and a summation of the separate effect of advance and going downhill above described for a central station as 215 relative to a radial station as 214.

Such algebraic effect provides that while the power provided to a central station as 215 going uphill, relative to the station radial thereto as 214 is increased over the power provided thereto (to that central station) on straight travel parallel to the station (as 214) radial thereto, as the system 211 is also sensitive to displacement transverse to the longitudinal axis of the string 219 the control system 242 therefor will act to prevent that the central station of the pair, as 215 advance ahead of its intended alignment position to an amount of displacement transverse to the longitudinal axis of the pipe string 219 beyond that permitted by the sensing and action of the control system 242 to such displacement notwithstanding the correction on action of motor 284 made by the control system 242 on relative uphill travel of one central station as 215 to another neighboring central station as 214 in the system 211.

Also, according to the control system provided, correction of power provided to a motor control as 281 and motor as 284 of a station as 215 due to relative downhill travel is tempered by and correction made for any lag of that station as this algebraic summation effect provides that while the power provided to a central station as 215 going downhill, relative to the station radial thereto as 214 is decreased from the power provided thereto (to that central station) on straight travel parallel to the station (as 214) radial thereto, as the system 211 is also sensitive to displacement transverse to the longitudinal axis of the string 219, the control system 242 therefor will act to prevent that the central station of the pair, 215, lag behind its intended alignment position to an amount of displacement transverse to the longitudinal axis of the pipe string 219 beyond that permitted by the sensing and action of the control system 242 to such displacement notwithstanding the correction on action of motor 284 made by the control system 242 on relative downhill travel of one central station as 215 to another neighboring central station as 214 in the system 211.

The above description of the vehicle tower station 215 is applicable to all of the intermediate vehicular tower stations as 213 through 217 of apparatus 211 as they all (as shown for 215) have the same structure in general and in particular, except for the station next to the end, i.e. station 212, are all identical in structure. Station 212 does not have control elements such as assembly 242 as are provided on station 215.

Station 212 is provided with a preset speed depending on amount and rate of water dispersal desired and area treated therewith. The motor at station 212 is the same as at stations 213—217, i.e. all the other stations of embodiment 211; the gear wheels as 87, are also the same and control assemblies as 281 turns the motor of each station on and off to maintain the pipe string portions aligned with less than a 1 degree twist or bend at zones as 340.

In summary in regard to apparatus 211 in view of that the rotation of the adjacent stations, as 214 and 215 on the apparatus 211 about a vertical axis is limited by the action of the control systems to less than 1 degree and usually less than 0.5 degrees and that the rotation of the adjacent stations about a longitudinal axis of the pipe string is also limited to less than 2 degrees and usually less than 1 degree, to simplify the construction and lessen the expense thereof the control adjustment is made more sensitive to the relative rotation or twist of the adjacent stations by using a single husky universal joint or coupling as in U.S. Pat. No. 1,528,070 between each pair of adjacent stations as 214 and 215 so that all such twist occurs across such coupling and tongue or arm 368 is located and dimensioned to be sensitive to any turning as well as any twisting and the algebraic sum of their effects while using a guyed pipe string structure firmly attached to a rigid station frame at each station as 213—217.

In operation a water supply source 210, as a well, is provided with a pump 177, and a conduit system 178 operatively connected thereto and to central vertical pipe portion at station 218. The vertical pipe portion is operatively connected to a watertight swivel joint with a vertical axis of rotation; the pipe portion 221 of the string of pipe 219 is operatively attached to that joint and all portions as 221—227 of the string of pipe string 219 are operatively connected in series as at flanges as 179 at end of each length of pipe forming the series 219, except where pliant joints as at 180 are used. Water is pumped through pipe string 219 at a uniform and continuous rate: all portions of the pipe string 219, supported on the moving vehicular stations as 212—217 move at an overall substantially uniform angular rate of movement in a circular path about station 218 and distribute water as 150 at a uniform weight per unit area on the field 28 traversed by the apparatus 211.

The motor 84 is an electric motor that is provided with gears to drive the sprocket 87 such as type JFN, Model X0400 motor Syncro Gear head assembly type GWB Model X08400, U.S. Electric Motor Division, Emerson Electric Company.

The control box 281 includes a magnetic motor starter, (as General Electric magnetic motor starter, (as General Electric magnetic motor starter NEMA size 0 and 1, as in General Electric bulletin GEF 4146C, Bloomington, Illinois) actuated by closing of the microswitch contact points and operatively connected to the motor, as 284, of that station by standard electric contact, whereby, on closure of the points of the microswitch the motor as 284 is powered through the starter from lines 362 and 363.

We claim:

1. A traveling sprinkler apparatus comprising in operative combination a pipe string assembly and a plurality of pipe supporting mobile stations and a control assembly for each of said plurality of pipe supporting stations; said pipe string assembly comprising a plurality of pipe string assembly portion, each of said pipe string assembly portions in series with another and extending radially from a central pipe pivot support, each of said pipe string assembly portions comprising a guyed pipe portion, a flexible conduit portion and a rigid conduit portion operatively connected in series; and each of said pipe string assembly portions extending from one radial station to a station central thereto;

a. said guyed portion comprises a liquid conduit with liquid spraying means operatively attached thereto and guying elements operatively connected thereto, and the radial end of said guyed portion is attached to said radial station and the central end of said guyed portion is operatively attached to the radial end of said flexible conduit portion;

b. the flexible portion comprises a flexible watertight liquid conduit rotatable about a vertical axis and about a horizontal axis and about the longitudinal axis of the pipe string, each said axis passing through said flexible portion, said flexible portion operatively connected at its central end to the radial end of said rigid portion; and c. said rigid portion comprises a conduit operatively connected at its central end to a pipe string assembly portion supported by and attached to the central station, and which rigid conduit portion extends radially from said central station; and each of said pipe supporting mobile stations comprising in operative combination a rigid frame and a ground engaging means and a motor means, and a motor control means and energy transmission means operatively connected to said motor control means, said motor means and ground engaging means operatively attached to and supported on said frame, said motor attached to said ground engaging means in driving engagement therewith and said motor control means operatively attached to said motor and firmly supported on the frame of said central station;

said control assembly comprising;

a. a rigid radial station position and orientation indicating vertically extending arm means, said arm means being firmly attached at one end to the guyed portion of said pipe string between one, radial, station and the flexible portion of the pipe string between said radial station and a station central thereto, b. a control arm support operatively attached to the rigid pipe portion of the pipe string assembly immediately central of said flexible portion and radial of said central station, c. said motor control means comprises a switch control arm and a switching mechanism, said switch control arm operatively connected to and controlling said switching mechanism, and d. a rigid arm pivotally supported on said control arm support and operatively connected at one end to said rigid radial station position and orientation indicating means and operatively connected at its other end to said switch control arm.

2. Apparatus as in claim 1 wherein said motor control is located above said pipe string.

3. Apparatus as in claim 2 wherein said switch control arm is actuated on angular movement of said radial station relative to said central station about the longitudinal axis of said pipe string portion and on movement of said radial station relative to said central station in a horizontal direction transverse to said longitudinal axis of said pipe string.

4. Apparatus as in claim 3 wherein said motor is activated by a 1 degree rotation of said central station relative to said radial station about the longitudinal axis of said pipe string.

5. Apparatus as in claim 4 wherein said motor control switching mechanism is activated by a minimum of 4 degrees rotation of said switch control arm.

6. Apparatus as in claim 3 wherein the flexible portion is reinforced by a mechanical joint.

7. Apparatus as in claim 2 wherein each of said vertical axis and horizontal axis and longitudinal axis intersects each other.

8. Apparatus as in claim 6 wherein said rigid arm is connected to said rigid radial station position and indicating means at a distance from said guyed portion of said pipe that is twice the diameter of said pipe.